United States Patent [19]

Pruvost

[11] Patent Number: 4,571,811
[45] Date of Patent: Feb. 25, 1986

[54] PROCESS FOR MANUFACTURING BALL JOINTS OR OTHER SELF-LUBRICATED JOINTS

[75] Inventor: Bernard Pruvost, Tournon, France

[73] Assignee: S.K.F. Compagnie d'Application Mecaniques & Compagnie, Saint Vallier sur Phone, France

[21] Appl. No.: 573,503

[22] Filed: Jan. 24, 1984

[30] Foreign Application Priority Data

Jan. 28, 1983 [FR] France ................................ 83 01663

[51] Int. Cl.[4] ...................... B23P 11/00; B23P 11/02; B21D 53/10; F16C 11/06
[52] U.S. Cl. .................................. 29/436; 29/148.4 L; 29/149.5 B; 29/149.5 S; 29/149.5 NM; 29/419 R; 29/423; 29/441 R; 29/447; 29/DIG. 35; 264/230; 384/203; 384/213; 403/38; 403/135
[58] Field of Search ..................... 29/419 R, 423, 424, 29/434, 436, 441 R, 445, 447, DIG. 35, 149.5 B, 149.5 S, 148.4 L, 149.5 NM, 418; 403/37, 38, 122, 135; 264/230; 384/192, 203, 206, 213

[56] References Cited

U.S. PATENT DOCUMENTS

| | | | |
|---|---|---|---|
| 1,675,933 | 3/1928 | Johnson | 403/38 |
| 1,718,229 | 6/1929 | Graham | 384/206 X |
| 2,999,710 | 9/1961 | Latzen | 403/37 |
| 3,048,061 | 8/1962 | Mele | 384/192 X |
| 3,163,475 | 12/1964 | Litsky | 384/206 |
| 3,266,123 | 8/1966 | McCloskey | 29/441 |
| 3,499,201 | 3/1970 | Roos | 384/203 X |
| 4,033,019 | 7/1977 | Orkin | 384/203 X |
| 4,089,095 | 5/1978 | Becker | 29/149.5 B |
| 4,111,499 | 9/1978 | McCloskey | 384/206 |
| 4,137,618 | 2/1979 | Krauss | 29/149.5 S |

Primary Examiner—Howard N. Goldberg
Assistant Examiner—Ronald S. Wallace
Attorney, Agent, or Firm—Young & Thompson

[57] ABSTRACT

A process for manufacturing ball joints or other self-lubricated joints, comprising placing the inner ring of the ball joint in a heat-retractable sheath of determined thickness and shrinking the sheath on this inner ring. The inner ring is then disposed in an outer ring blank which is then deformed so that the sheath is clamped between the outer and the inner ring. After machining of the blank, the assembly is treated so as to eliminate the heat-retractable sheath and thus form between the two rings a free space whose thickness corresponds to that of the sheath. A self-lubricating resin is then injected in this space.

7 Claims, 8 Drawing Figures

PROCESS FOR MANUFACTURING BALL JOINTS OR OTHER SELF-LUBRICATED JOINTS

FIELD OF THE INVENTION

The invention relates to a process for manufacturing ball joints or other self-lubricated joints.

BACKGROUND OF THE INVENTION

Self-lubricated ball joints, in which the two rings of the ball joint are separated from each other by a self-lubricating resin of the phenol, ablative or kerimide type, reinforced or not with materials such as polytetrafluoroethylene for example, are frequently used in mechanics and aeronautics or even in medicine. However, heretofore produced ball joints of this type are expensive and the disparity in results is appreciable.

It is an object of the present invention to provide a process for manufacturing ball joints or like joints at reduced costs, such joints further presenting exceptional wearing properties.

BRIEF SUMMARY OF THE INVENTION

The process according to the invention is characterized in that it comprises the steps of: placing the inner ring of the ball joint in a heat-rectractable sheath of determined thickness; shrinking the sheath on this inner ring; mounting the latter in an outer ring blank; deforming this blank so that the sheath is clamped between it and the inner ring; after machining of the blank, treating the whole so as to eliminate the heat-retractable sheath and thus form between the two rings a free space whose thickness corresponds to that of the sheath; and injecting a self-lubricating resin in this space.

The self-lubricating resin may be reinforced with fibers, for example of glass or carbon. These fibers may be placed in the sheath, before it is shrunk, or they may be mixed with the injected resin.

A layer of meltable fibers may possibly be placed in the sheath, before it is shrunk, and these fibers may then be eliminated at the same time as the sheath.

A plurality of inner rings is advantageously placed in the same sheath, such rings being separated after shrinkage of the sheath.

BRIEF DESCRIPTION OF THE DRAWINGS

The invention will be more readily understood on reading the following description with reference to the accompanying drawings, in which.

PARTICULAR DESCRIPTION OF THE DRAWINGS

Figure 1:
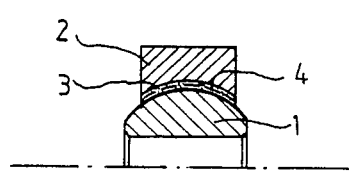
FIG. 1 shows a ball joint in section.
Figure 3:
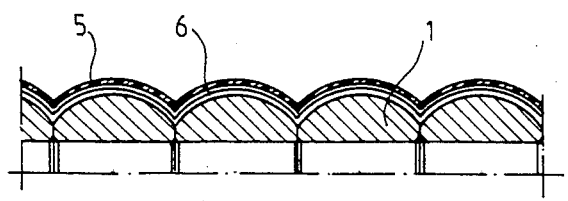
Figure 4:
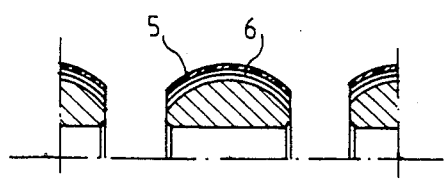

Referring now to the drawings, to produce a ball joint comprising an inner ring 1 and an outer ring 2, separated from each other by a self-lubricating composite 3, reinforced with fibers 4 (FIG. 1), a series of inner rings 1, whose spherical portion has been coated with a product for stripping or demoulding, is firstly placed in a heat-retractable sheath 5 of given thickness, disposing in the sheath a layer of meltable fibers and a layer of fibers adapted to reinforce the self-lubricating resin, for example glass or carbon fiber these two layers are generally designated in the drawing by reference 6. The sheath 5 is then shrunk, as shown in FIG. 3, and each inner ring 1 is separated (FIG. 4).

Figure 5:
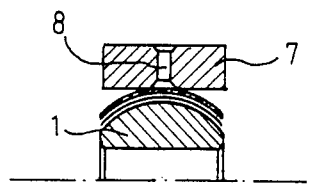
FIGS. 2 to 8 show the various steps of the process.
Figure 2:
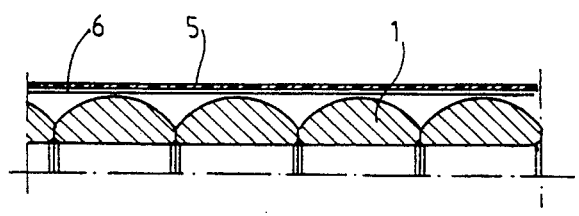
Figure 6:
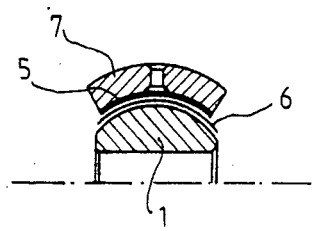
Figure 7:
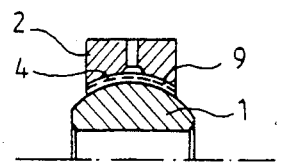

Each inner ring 1 is then fitted in an outer ring blank 7 which comprises an injection orifice 8 (FIG. 5) and the whole is deformed, for example by stamping, so as to give the inner face of the blank the desired curvature (FIG. 6). The outer ring is then machined and the assembly formed by the two rings is then treated so as to eliminate the shrunk sheath 5 and the layer of fibers of meltable matter. The two rings 1 and 2 are now separated from each other by a space 9 of known thickness, in which glass fiber or other fiber 4 is found (FIG. 7).

Figure 8:
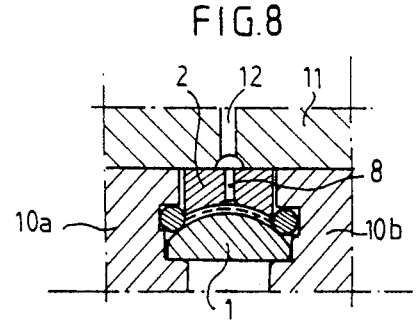

All that remains is to inject a self-lubricating resin, for example polytetrafluoroethylene, between the two rings 1 and 2 and to polymerize this resin. Injection may be effected for example as shown in FIG. 8 in a mould comprising two inner elements 10a and 10b and an outer element 11 provided with an injection orifice 12. The resin penetrates through orifices 8 and 12 into the space 9 separating the two rings 1 and 2, embedding the fibers 4.

In a variant, the layer of meltable fibers and that of reinforcing fibers may be eliminated, the latter fibers in that case being mixed with the resin injected into the space 9.

It goes without saying that the present invention is not to be considered as being limited to the embodiment described and shown, but covers, on the contrary, all the variants thereof.

I claim:

1. A process for manufacturing ball joints or other self-lubricated joints, comprising assembling the inner ring of a ball joint within a heat retractable sheath of determined thickness, shrinking the sheath about the outer surface of said inner ring, assembling the inner ring and shrunken sheath within an outer ring blank, deforming said outer ring blank so that the sheath is clamped between the deformed outer ring blank and the inner ring, eliminating the sheath from between the inner ring and the deformed outer ring blank thereby to leave between the inner ring and the deformed outer ring blank a free space whose thickness corresponds to that of the sheath, and injecting a self-lubricating resin in said free space.

2. A process as claimed in claim 1, and machining the outer ring blank after said deformation of said outer ring blank.

3. A process as claimed in claim 1, and disposing fibers for reinforcing the self-lubricating resin in the sheath before the sheath is shrunk.

4. A process as claimed in claim 1, and mixing fibers for reinforcing the self-lubricating resin with the resin prior to injection.

5. A process as claimed in claim 1, and placing a layer of meltable fibers in the sheath before the sheath is shrunk and eliminating said meltable fibers at the same times as the sheath.

6. A process as claimed in claim 1, and assembling a plurality of interconnected said inner rings within a same sheath prior to shrinking the sheath, and separating the rings from each other after the sheath has been shrunk.

7. A process as claimed in claim 1, and providing an injection hole in said outer ring blank, and injecting said resin through said injection hole.

* * * * *